No. 783,490.    Patented February 28, 1905.

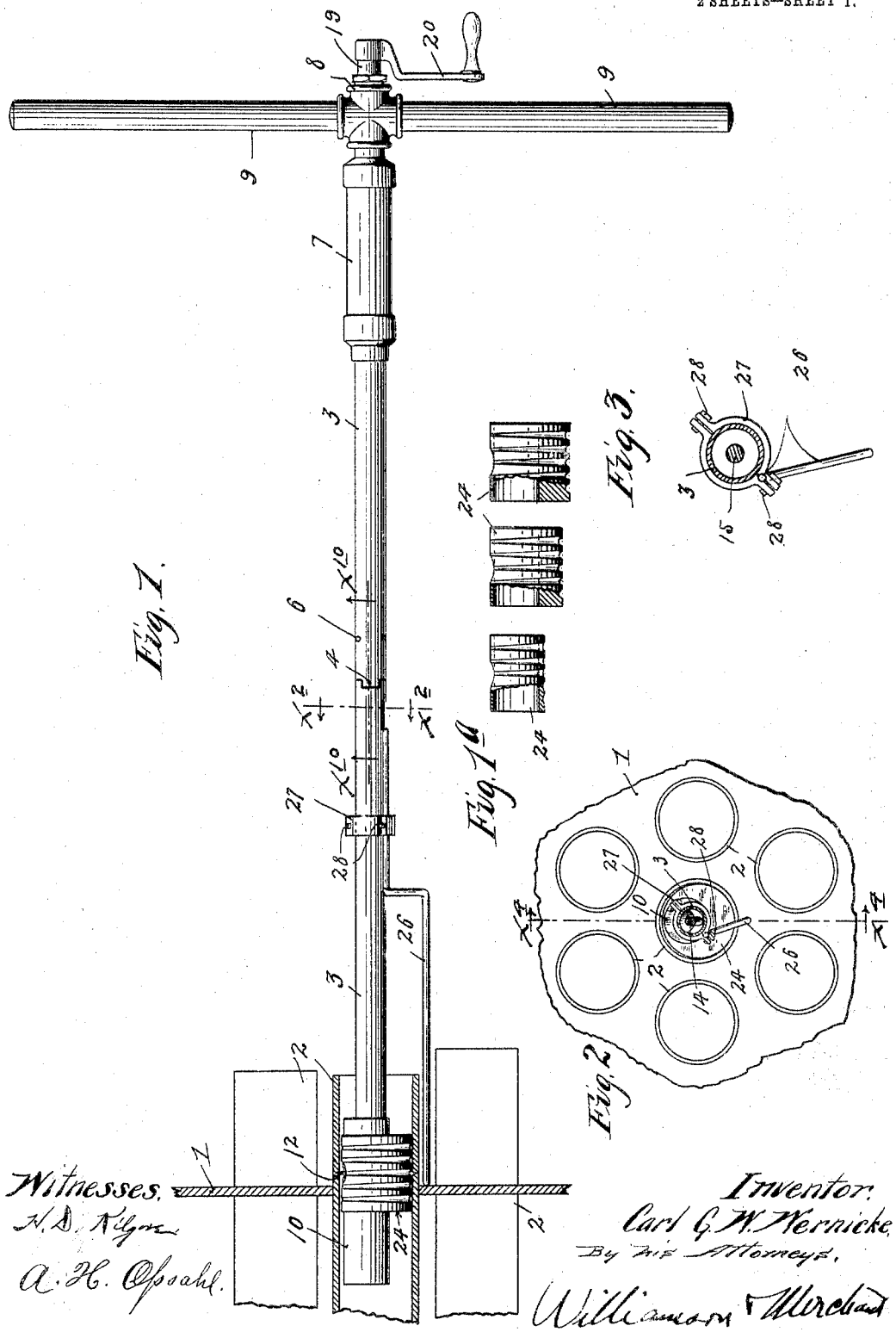

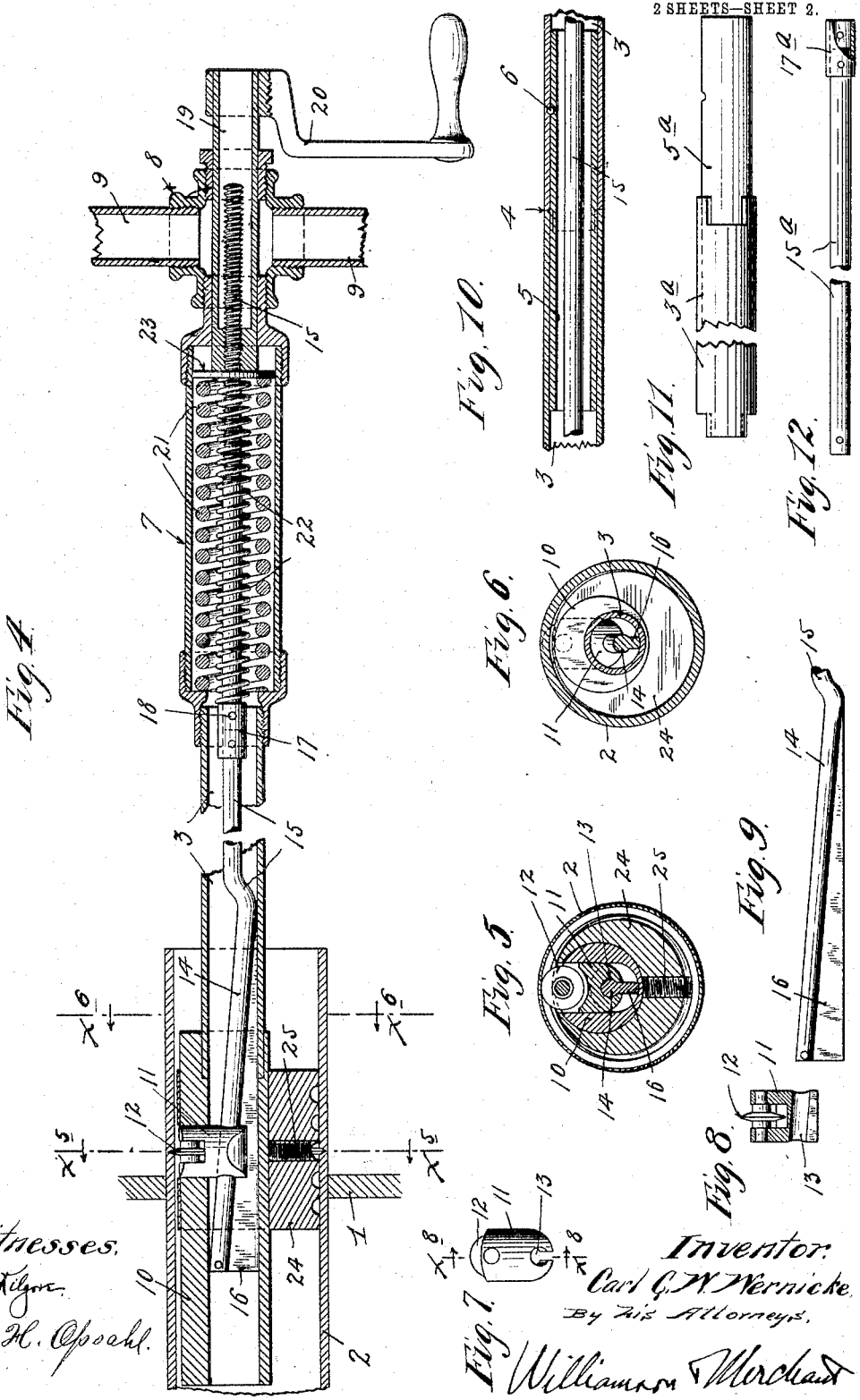

UNITED STATES PATENT OFFICE.

CARL G. W. WERNICKE, OF MANKATO, MINNESOTA.

FLUE-CUTTER.

SPECIFICATION forming part of Letters Patent No. 783,490, dated February 28, 1905.

Application filed February 27, 1903. Serial No. 145,367.

*To all whom it may concern:*

Be it known that I, CARL G. W. WERNICKE, a citizen of the United States, residing at Mankato, in the county of Blue Earth and State of Minnesota, have invented certain new and useful Improvements in Flue-Cutters; and I do hereby declare the following to be a full, clear, and exact description of the invention, such as will enable others skilled in the art to which it appertains to make and use the same.

My present invention has for its object to provide an improved flue-cutter; and to this end it consists of the novel devices and combinations of devices hereinafter described and defined in the claims.

The invention is illustrated in the accompanying drawings, wherein like characters indicate like parts throughout the several views.

Figure 1 is a view principally in side elevation with some parts sectioned, showing my improved flue-cutter applied in working position to cut one of the flues of the boiler. Fig. 1$^a$ is a view, partly in plan and partly in section, showing several of the eccentric guide-rings removed from working position. Fig. 2 is a vertical section on the line $x^2 x^2$ of Fig. 1. Fig. 3 is a similar section to Fig. 2, but on a larger scale and with some parts removed. Fig. 4 is a horizontal section on the line $x^4 x^4$ of Fig. 2, some parts being broken away. Fig. 5 is a transverse section on the line $x^5 x^5$ of Fig. 4. Fig. 6 is a transverse section on the line $x^6 x^6$ of Fig. 4. Fig. 7 is a detail showing the cutter-block in side elevation. Fig. 8 is a section on the line $x^8 x^8$ of Fig. 7. Fig. 9 is a side elevation of the cam end of the feed-rod. Fig. 10 is a horizontal section on the line $x^{10} x^{10}$ of Fig. 1, some parts being broken away. Fig. 11 is a plan view of an extension-section of the operating-tube, some parts being broken away; and Fig. 12 is a plan view of an extension-section of the feed-rod, some parts being broken away.

The numeral 1 indicates the flue-sheet, and the numeral 2 the flues of a boiler, the outer end of the flues being shown as projecting through the flue-sheet and requiring to be cut off.

Referring now to the flue-cutter, the numeral 3 indicates an operating-tube, which, as shown, is formed by detachable sections. The sections of the operating-tube are preferably detachably connected, as best shown in Figs. 1 and 10, wherein the abutting ends of the tube-sections engage with an interlocking clutch-joint 4, and one of said sections has a rigidly-secured sleeve 5, which telescopes into the other section and is connected therewith by a pin 6 or other suitable device. Near its outer end the outer section of the operating-tube 3 has an enlarged tubular spring case or section 7, the outer head of which in turn is shown as rigidly connected to a head 8, having oppositely-projecting detachable handbars 9. The projecting end of the inner section of the operating-tube 3 is rigidly connected to an eccentric bearing-sleeve 10, provided with a bore which is concentric with and forms a continuation of the interior of said operating-tube 3. In the thickest portion of the eccentric bearing-sleeve 10 is a radial seat in which is mounted a short plunger-like cutter head or block 11, which carries a cutting-wheel 12. In the inner portion of the head 11 is an inclined cam-seat 13, the body of which is cylindrical and has a contracted lateral slot or opening.

The cam-seat 13 of the head 11 closely fits the inclined cylindrical cam-section 14 of a feed-rod 15, which cam-section is provided with a web 16, that projects outward through the contracted slot or opening of the seat 13 and bears against the interior of the bearing-sleeve 10. The head 11, acting on the said web 16, prevents the feed-rod 15 from rotating with respect to the operating-tube 3.

The operating-rod 15 is screw-threaded at its outer end and is in the present instance formed in sections that are detachably united by means of a socket 17, rigidly secured to one of the sections and rigidly but detachably secured to the other section, preferably by means of a pin 18. A sleeve-nut 19, loosely mounted in the head 8 and in one hub of the spring-case 7, is provided at its outer end with a hand-crank 20 and at its inner end has screw-threaded engagement with the screw-threaded end of the feed-rod 15. Within the case or section 7 of the operating-tube is a heavy coiled spring 21 and a relatively light coiled spring 22, both of which springs surround the feed-rod and the former of which surrounds the smaller spring 22. The spring 21 is a feed-spring and is compressed between one hub of the case-section 7 and a washer 23 on the feed-rod 15 adjacent to the inner end of the sleeve-nut 19. The spring 22 is compressed between the washer 23 and the socket 17 of the feed-rod 15.

In connection with the tool so far described I provide a plurality of eccentric guide-rings 24, having different exterior diameters; but each having an eccentrically-located cylindrical perforation or bore which will closely fit the exterior of the bearing-sleeve 10. At their thinnest peripheral portions the eccentric guide-rings 24 are provided with axial perforations which are adapted to aline with the outer end of the cutter-head 11 and to permit the said head and its cutting-wheel 12 to be moved outward therethrough when the particular ring is properly positioned on the bearing-sleeve 10. Set-screws 25, which work through the thickest peripheral portions of the guide-rings 24, serve to securely hold the same in working position on the sleeve 10. These guide-rings 24, having different exterior diameters, are adapted to fit the interior of tubes or flues of different size. The thick portion of the eccentric bearing-sleeve 10 is of such dimensions as to permit the cutter-head 11 to be moved inward far enough to carry the peripheral portion of its cutting-wheel 12 inward of the peripheral portion of the sleeve 10, and thus permit the eccentric guide-rings 24 to be slipped to and from working positions. It is here important to note that the thin peripheral portions of the several eccentric guide-rings 24 are of the same or approximately the same thickness. Hence when the cutter-head 11 is projected a given distance its wheel 12 will cut to the same depth regardless of the size or exterior diameter of the eccentric guide-ring. Hence the tool without any readjustments except of course as to the substitution of eccentric guide-rings 24 will cut a tube or flue of any diameter.

In Figs. 11 and 12 are shown devices for extending, respectively, the operating-tube 3 and feed-rod 15. In Fig. 11, 3$^a$ indicates the tubular extension-section, having its ends notched to form the interlocking joints 4, previously described, and provided with a telescoping coupling-sleeve 5$^a$, corresponding to the sleeve 5, previously described, and adapted to be connected to the outer section of the tube 3 by a pin or otherwise. The section 3$^a$ 5$^a$ is adapted to be interposed between the main sections of the operating-tube 3. In Fig. 12 the rod-section 15$^a$ is provided with a socket 17$^a$, which adapts it to be interposed between the sections of the feed-rod 15 and to be connected therewith in the same manner as the sections of the said rod are connected in Figs. 1 and 4 and as already described.

26 indicates a crank-like gage-rod which is adapted to be held in any set position and clamped to the inner section of the operating-tube 3 by means of a split clamping-ring 27, which surrounds said tube and, as shown, is adapted to be adjustably clamped thereto by means of screws 28.

It is evident that when the feed-rod 15 is moved outward or toward the right with respect to Fig. 4 its cam 14 will move the cutter-block 11 and its wheel 12 radially outward, while under a reverse movement of the said rod the said block and wheel will be moved radially inward. It is also evident that under the above movements the block 11 is always moved radially and on a straight line, so that the cutting-wheel 12 always stands in the same plane intersecting the axis of the bearing-sleeve 10 at a right angle.

By turning the hand-crank 20 and the nut-sleeve 19 the washer 23 is forced away from the adjacent head of the case-section 7, and the feed-spring 21 is thereby compressed, as shown in Fig. 4. This action of course assumes that the tool is in working position, so that the feed-spring finds one base of reaction against the left hand of the case 7 and another base of reaction against the cutting-wheel 12, which wheel is thereby yieldingly pressed against the flue or tube which is to be cut. The feed-spring 21 when thus compressed therefore yieldingly presses the cutting-wheel to its work with a force which is dependent on the tension under which the said spring 21 is compressed.

The cutting-wheel 12 is caused to cut the tube by causing the operating-tube 3 to rotate, and this rotation of said tube 3 is of course produced by taking hold of the hand-pieces 9 and rotating the tool. The thick peripheral portion of the eccentric guide-ring 24 bears against the interior of the flue at points longitudinally thereof on the opposite sides of the plane of the cutting-wheel 12, and hence causes the said cutting-wheel to travel always in the same path over the interior of the said flue, thereby preventing the said wheel from wabbling and cutting an irregular groove or thread on the interior of the flue.

The eccentric bushing or ring 24 is formed with peripheral grooves that run completely around the same and which divide the periphery of the bushing into a plurality of comparatively narrow ridges that are adapted to cut through the scale of the tube, the said grooves affording spaces into which the loosened scale may crowd. This construction greatly reduces the friction under which the tool must be turned within the tube and it also prevents the sleeve or bushing, and hence the whole tool, from slipping endwise within the tube when it is rotated.

When the cutting-wheel is to be retracted or moved inward from an operative position, the crank 20 and sleeve-nut 19 are turned reversely, so that the washer 23 is permitted to move outward against the outer head of the case-section 7, and thus relieve the feed-spring 21 from strain or at least to render the same inoperative to force the feed-rod 15 farther toward the right or outward. This being done the retracting-spring 22 becomes operative to force the feed-rod 15 and its cam 14 inward or toward the left as far as permitted by the sleeve-nut 19.

After a number of flues have been patched or extended at their ends and again applied to the boiler they will project therethrough variable distances. The flues must, however, be cut off, so that they will all project the same distance through the flue-sheet. The gage-rod 26 when properly set, so that its projecting end will bear against the flue-sheet and pass between the flues, will cause the cutting-wheel always to be brought to the same position with respect to the flue-sheet. The gage-rod 26 is made of crank-like form to enable its operating end to be adjusted the proper distance from the tube 3 to pass between the projecting ends of the flues.

When the sleeve-nut 19 is screwed outward, so as to permit the washer 23 to strike against the shoulder of the hand-piece 9, the feed-spring 21 will no longer act upon the said sleeve-nut and rod 15, and at this time the retracting-spring 22, reacting against the said washer and against the coupling or sleeve 17 of said rod, keeps the inner end of the said sleeve-nut in engagement with said washer, forces the said rod 15 toward the left with respect to Fig. 4, and keeps the block 11 drawn inward as far as permitted by the screw-threaded engagement between the rod 15 and the sleeve-nut 19.

It will of course be understood that the device described is capable of considerable modification within the scope of my invention as herein set forth and claimed. For instance, the so-called "eccentric" guide-rings instead of being complete rings might in some instances be of crescent form, and this would be within the scope of my invention, although not the full equivalent of the complete eccentric-ring. In the drawings the tool is illustrated as used for cutting off the projecting ends of patched flues; but it is of course obvious that it is equally serviceable for cutting off old flues and that in this use of the device the gage-rod will be serviceable to locate the cutting-wheel, so that it will cut off the flues at a predetermined distance inward of the flue-sheet. Furthermore, the gage-rod may be so adjusted that instead of engaging with the flue-sheet it will engage the end of the flue, and thus adapt the tool to cut off from a flue or tube sections of a predetermined length.

As already indicated the flue-cutter may be extended so that it will reach any desired distance into the tube or flue. It will be further understood that the flue-cutter may be rotated by hand-power devices other than that described—as, for instance, by ratchet device—or may be rotated by a power device, such as a portable pneumatic engine, for example.

As is obvious the radially-movable head 11 instead of being provided with cutting-disks 12 might be provided with dull-edged rollers or wheels, adapting the device for use as a flue-expander, and this would be within the scope of the claims of this application wherein the expression "cutter" is used.

What I claim, and desire to secure by Letters Patent of the United States, is as follows:

1. In a flue-cutter, the combination with an operating-tube having hand-pieces by means of which it may be turned and provided with a bearing-sleeve at one end, of a cutter-block carrying the cutter-tool and movable radially through said bearing-sleeve, a feed-rod within said tube provided with a cam for action on said cutter-block, an adjusting-nut mounted in the outer end of said operating-tube and working on the threaded end of said feed-rod, a feed-spring reacting against said tube and against said nut, and a retracting-spring reacting on said nut and the said feed-rod, substantially as described.

2. In a flue-cutter, the combination with a bearing-sleeve and a cutter movable radially therethrough, of an eccentric bearing-ring on said bearing-sleeve, with its thin portion perforated to pass said cutter, said eccentric bearing-sleeve having a plurality of circumferentially-extended grooves, substantially as and for the purposes set forth.

In testimony whereof I affix my signature in presence of two witnesses.

CARL G. W. WERNICKE

Witnesses:
A. E. CLARK,
J. W. SCHMITT.